Oct. 25, 1966 R. H. SCHULTZ ETAL 3,281,092
SELF-ADJUSTING MILL ROLL SUPPORTING MANDREL
Original Filed Aug. 17, 1961 2 Sheets-Sheet 2
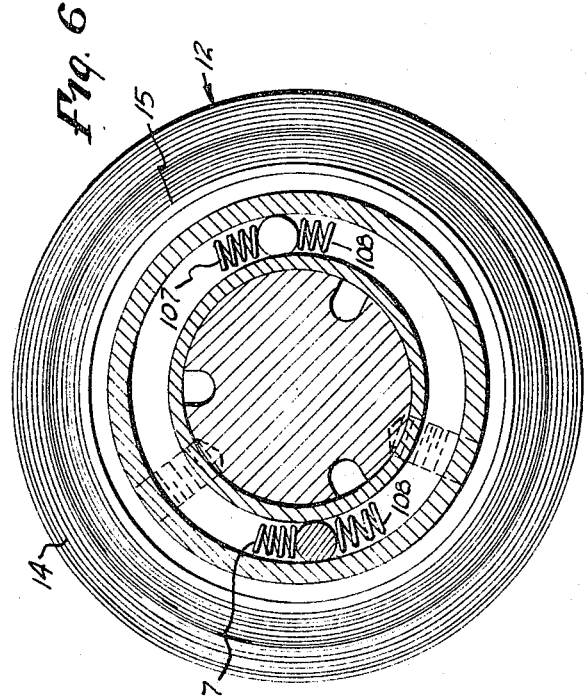
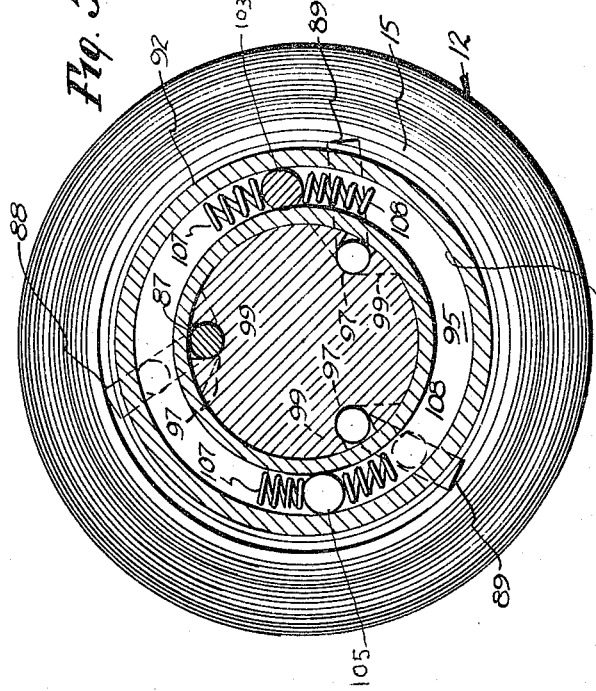
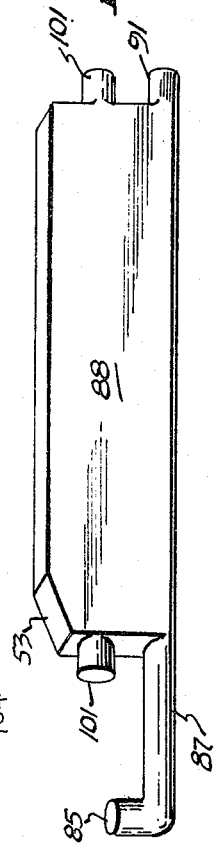
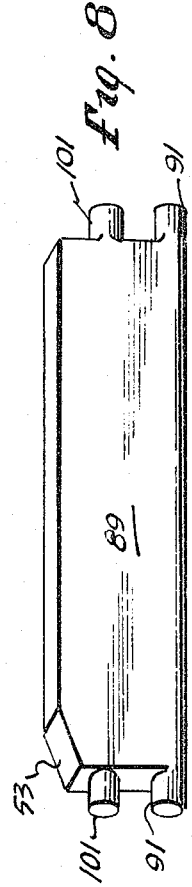
INVENTORS:
RUDOLPH HENRY SCHULTZ
ADAM JAMES SIEBERT,
DECEASED, BY BERTHA SIEBERT HIS EXECUTRIX
E. M. Squire
ATTORNEY.

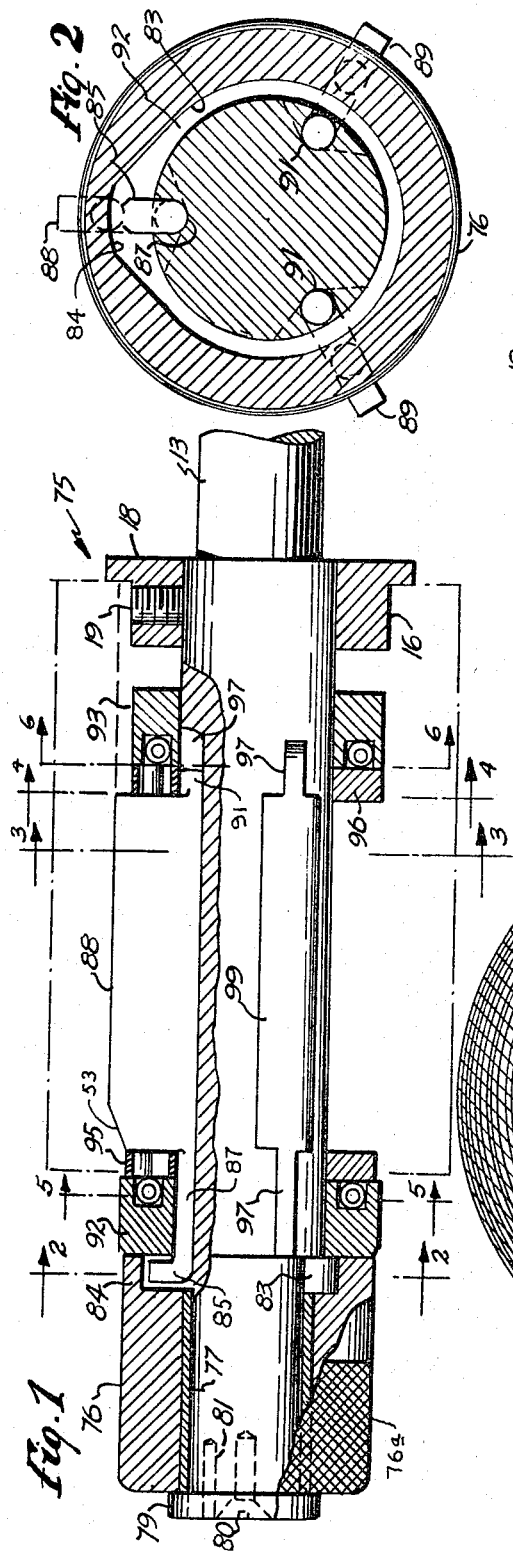
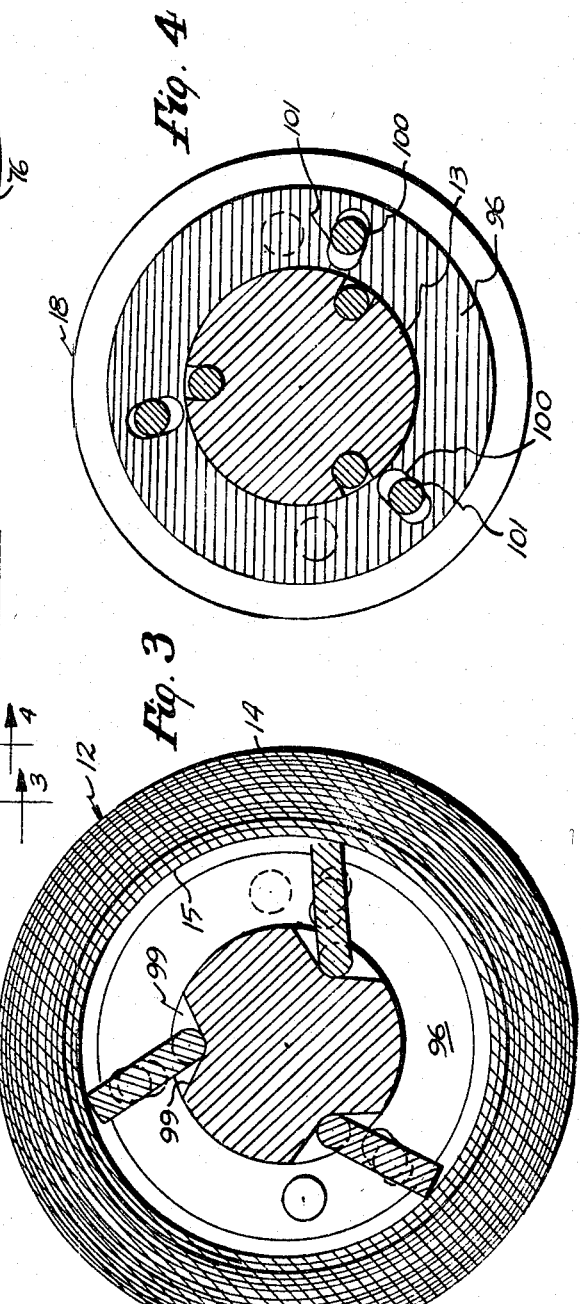
INVENTORS:
RUDOLPH HENRY SCHULTZ
ADAM JAMES SIEBERT,
DECEASED, BY BERTHA SIEBERT HIS EXECUTRIX
E. M. Squire
ATTORNEY.

United States Patent Office 3,281,092
Patented Oct. 25, 1966

3,281,092
SELF-ADJUSTING MILL ROLL
SUPPORTING MANDREL
Rudolph H. Schultz, Brooklyn, N.Y., and Adam James Siebert, deceased, late of Flushing, N.Y., by Bertha Siebert, executrix, Flushing, N.Y., assignors to Schultz Sales Corporation, Brooklyn, N.Y., a corporation of New York
Original application Aug. 17, 1961, Ser. No. 132,242, now Patent No. 3,146,964, dated Sept. 1, 1964. Divided and this application Aug. 27, 1964, Ser. No. 399,123
9 Claims. (Cl. 242—72)

This application is a division of our application Serial No. 132,242 filed on August 17, 1961, now Patent No. 3,146,964 issued on September 1, 1964.

The present invention relates to a reversible self-centering mandrel for simultaneously supporting the core of a relatively large mill-roll of web material and positively griping the core to apply a braking torque or similar control torque thereto while the web is being fed to a processing machine such as a rewinding machine.

The mandrel of the present invention positively grips the internal surface of the hollow core of the mill-roll so that a continuous undirectional braking or control torque may be applied to the mill-roll for tensioning the web and regulating the paying out velocity.

The mandrel comprises gripping flaps which engage the core of the mill-roll and which are yieldingly urged to assume radially outwardly extending positions. The flaps may be manually displaced in either direction prior to insertion of the mandrel in the mill-roll to permit the control torque to be applied in one direction or the other, as desired.

Generally, the mandrel of the present invention comprises a main shaft arranged to be mounted in and controlled by the processing machine to which the web is delivered from the mill-roll. The main shaft is provided with axially spaced supporting collars over which the core of the mill-roll may slide freely. Disposed intermediate the two supporting collars is a group of elongated axially extending griping flaps which are symmetrically and uniformly angularly spaced around the longitudinal axis of the main shaft. Each gripping flap is individually pivoted for limited angular movement in either direction about an axis spaced from and parallel to the longitudinal axis of the main shaft. The free edges of the gripping flaps simultaneously engage the internal surface of the mill-roll core and dig into the internal surface so that the unidirectional control torque is positively transmitted from the control shaft to the mill-roll core without any slippage. Relative rotation between the mill-roll and the main shaft in the reverse direction will urge the flaps inwardly against the yielding action of the spring mechanism, thereby unlocking the gripping flaps so that the mandrel may be withdrawn from the mill-roll.

At one end, each of the gripping flaps is provided with a sloping cam surface which forces the flap inwardly against the action of the spring mechanism as the mandrel is inserted in the core of the mill-roll. Because the mandrel is reversible, the flaps must be manually pre-set in one direction or the other from their radially outwardly extending positions in accordance with the desired direction of rotation. Thereafter, the sloping cam surfaces which engage one end of the core are effective to complete the inward angular displacement of the flaps. A smooth cylindrical collar is provided as one of the supporting members for the mill-roll, the other supporting member being a flanged collar which cannot enter the core. The cam surfaces are located adjacent to the smooth collar and the flaps extend between the two collars or supporting members.

In practice, a brake drum, a gear, or other element co-operating with the processing machine is placed adjacent to the flanged supporting collar or is connected to the shaft beyond the supporting collar. If one surface of the web is different from the other, as by being coated whereas the other side is uncoated, it may be necessary to have the coated surface facing upwardly, for example, as the web is fed to the processing machine. On the other hand, a particular end of the mandrel must always be located at the same side of the machine. It frequently happens that a group of mill-rolls are received wherein the finished side faces outwardly instead of inwardly. Accordingly, the direction of rotation of the mandrel must be reversed to accommodate the reversely wound mill-rolls. The reversible mandrel of the present invention permits such reverse rotation.

Various objects, advantages and features of the invention will become apparent upon reading the following specification with reference to the accompanying drawing forming a part hereof.

Referring to the drawing:

FIGURE 1 is a longitudinal sectional view of a reversible mandrel, partly broken away, with one of the flap members removed.

FIGURE 2 is an enlarged transverse sectional view taken alone the line 2—2 of FIG. 1 with all of the flap members in place.

FIGURE 3 is an enlarged transverse sectional view taken along the line 3—3 of FIG. 1 with the mill-roll and all of the flap members in place.

FIGURE 4 is a transverse sectional view similar to FIG. 2 taken along the line 4—4 of FIG. 1 with all of the flap members in place.

FIGURE 5 is a transverse sectional view taken along the line 5—5 of FIG. 1 with the mill-roll and all of the flap members in place.

FIGURE 6 is a transverse sectional view taken along the line 6—6 of FIG. 1 with the mill-roll and all of the flap members in place.

FIGURE 7 is a perspective view of the gripping flap member which is directly controlled by the manually operable direction selecting collar.

FIGURE 8 is a perspective view of one of the other gripping flap members.

Referring to FIGS. 1 through 8, a reversible mandrel 75 supports a mill-roll designated generally as 12 and includes a main shaft 13. The main shaft 13 is mounted in a web utilizing machine (not shown) and serves as a support for the mandrel 75 and mill-roll 12. The mill-roll 12 comprises a web 14 of sheet material wound on a hollow cylindrical core 15. The core 15 is freely slidable over a collar 16. The collar 16 is provided with an integrally formed flange 18 which limits axial movement of the mill-roll 12 toward the right as viewed in FIG. 1. The collar 16 is secured to the shaft 13 by set screws 19.

A direction selecting cylindrical control sleeve 76 is mounted coaxially with the shaft 13 at the end thereof remote from the flanged collar 16. The control sleeve 76 is provided internally with an anti-friction bushing 77. The sleeve 76 is held against axial movement toward the left, as viewed in FIG. 1, by a circular disc 79 secured to the end or shaft 13 by a flat-head screw 80. The disc 79 is held against turning relative to the shaft 13 by a pin 81. The sleeve 76 has a cylindrical recess 83 formed in one end thereof. The recess 83 is radially enlarged at 84. A lug 85 extends into the enlargement 84 so that turning of sleeve 76 will produce angular displacement of the lug 85. The lug 85 is integrally formed on the shank 87 of a gripping flap member 88. The end of flap member 88 opposite lug 85 and the other two gripping flap members 89 have short shanks 91.

Two spring retaining collars 92 and 93 are fixed on the shaft 13. The shank 87 of flap member 88 (FIG. 5) extends under the collar 92 so that the lug 85 formed on its free end may protrude into the enlargement 84. The shank 87 also extends under rotatable actuating collar 95 interposed between the spring retaining collar 92 and the ends of the flaps 88, 89. A further actuating collar 96 is interposed between the spring retaining collar 93 and the ends of the flaps 88, 89. The shaft 13 has three longitudinally extending grooves 97 formed therein. Adjacent its ends, each of the grooves 97 has a rounded bottom and straight parallel side walls. The depth of the grooves 97 is such that the control shank 87 and all of the short shanks 91 are rotatably retained in the grooves 97 by the actuating collars 95 and 96. The walls of the grooves 97 are symmetrically bevelled intermediate their ends as indicated at 99. The bevelled portions 99 permit pivotal movement of each of the flap members 88, 89 in either direction with respect to a radial plane passing through the rotational axis of the shaft 13 and the pivotal axis of the flap member. Each of the actuating collars 95 and 96 has three symmetrically arranged radially elongated slots 100 formed therein. Each of the flap members 88, 89 has an integrally formed axially projecting actuating stud 101 which is spaced radially outwardly from the shank 87 or the shanks 91. Each of the actuating studs 101 is received in one of the slots 100. All of the flaps 88, 89 are thus linked together by the actuating collars 95 and 96 so that they will pivot in unison about the axes of the shanks 87, 91.

Each of the actuating collars 95 and 96 is provided with a stud 103 which projects into an annular groove 104 formed in one of the spring retaining collars 92 or 93. A fixed stud 105 is located in each of the annular grooves 104 diametrically opposite the movable stud 103 carried by the actuating collar 95 or 96. Two helical compression springs 107 and 108 extend between each fixed stud 105 and the associated movable stud 103. Each of the compression springs 107 and 108 is constrained to assume a semicircular configuration by the walls of the groove 104 in which it is confined. The springs 107 and 108 are balanced so that the gripping flap members are yieldingly urged to assume radially outwardly extending positions. By manually rotating the control sleeve 76 in either direction, both of the flap members 89 will be displaced from their normal radial positions along with flap member 88 which is acted upon directly by displacement of its lug 85.

The mandrel is initially inserted into the mill-roll 12 with the control sleeve 76 first. The mill-roll is sufficiently short so that the knurled portion 76a of the control sleeve 76 will protrude beyond one end of the mill-roll core 15 at the time when the cam surfaces 53 first engage the other end of the core 15. Before the mandrel can be further inserted into the core 15, the flaps 88, 89 must be displaced from their radially outwardly extending positions in one direction or the other, depending upon the desired direction of rotation for unwinding the web from the mill-roll 12. This is accomplished by grasping the protruding knurled surface 76a of the control sleeve 76 so that all of the flap members will be displaced from the radial in accordance with the particular direction of rotation which accompanies unwinding of the web 14 from the mill-roll 12.

For example, one surface of the web 14 (FIG. 3) may differ from the other. One surface, which could be assumed to be glossy, for purposes of illustration, must always be the upper surface during unwinding whereas the other surface, which may be assumed to be a dull surface, must always be the lower surface. If all mill-rolls are always wound with the dull surface out, then unidirectional unwinding is possible as illustrated in Patent No. 3,001,736, the web being drawn from the bottom of the roll. If, however, some of the mill-rolls are wound with the glossy surface out, then the direction of unwinding must be reversed in order for the glossy surface to constitute the upper surface. This means that the web will be drawn off the top of the roll instead of the bottom and that the direcion of rotation will be reversed.

The mandrel 75 is inserted into the mill-roll core 15 from one end or the other to provide the desired surface as the upper surface when unwinding. The collar 76 is rotated so that the braking torque which is transmitted by the shaft 13 may be applied in the correct direction to resist unwinding after the mandrel has been fully inserted in the core 15. This reversible feature permits a brake drum (not shown) to be permanently fixed on the shaft 13 on the free end portion which is nearer to the flanged collar 16.

Thus, after initially displacing the flap members 88, 89 from their normal radial positions, the cam surfaces 53 may be inserted in the core 15 of the mill-roll 12 and, as the mandrel is inserted further into the core 15, the flaps will retain their original direction of displacement. Thereafter, the gripping edges of the flap members will engage the core 15, as described above.

While we have shown what we believe to be the best embodiments of our invention, it will be apparent to those skilled in the art that various changes and modifications may be made therein without departing from the spirit and scope of the invention as defined in the appended claims.

What is claimed is:

1. A mandrel for supporting a roll of web material wound on a tubular core, said mandrel comprising in combination: a main shaft to which a control torque is applied for regulating the tension in said web during the unwinding of said web from said roll; a plurality of gripping members carried by said shaft for rotation therewith, each of said gripping members being pivoted for movement about an axis parallel to the axis of said main shaft in either direction from a radially outwardly extending direction, each of said gripping members comprising a free edge portion which moves in an arcuate path during said pivotal movement; resilient means yieldingly urging pivotal movement of said gripping members to move said free edge portions outwardly for engagement with the internal surface of said core when said roll is mounted on said mandrel with a pressure which increases progressively with increased tension in said web as said web is pulled from said roll against the action of said control torque, said pivotal axes being disposed with respect to the longitudinal axis of said main shaft to cause said pressure to increase sufficiently to lock said core to said mandrel, said gripping members being urged by said resilient means to assume positions wherein they extend generally radially outwardly of said shaft with said core removed from said mandrel; a pair of collars fixed to said shaft and disposed in proximity to opposite ends of said gripping members, said collars each having a portion of external diameter slightly less than the internal diameter of said core for sliding freely through said core to permit insertion of said mandrel in said core and removal of said mandrel therefrom, said collars being arranged to support said roll on said mandrel independently of said gripping members; and a manually operable member connected to displace all of said gripping members simultaneously for producing pivotal movement thereof selectively in either direction from the radially outwardly extending positions to which they are urged by said resilient means.

2. A mandrel according to claim 1, in which one of said supporting collars comprises a stop flange for positioning said roll axially on said mandrel.

3. A mandrel according to claim 1, in which each of said gripping members is provided with a smooth cam surface located adjacent to the end of each gripping member which first enters said core, said cam surface being shaped to cause progressive pivotal movement of said gripping members against the yielding action of said resilient means as said mandrel is inserted longitudinally into said core.

4. A mandrel for supporting a roll of web material wound upon a tubular core, said mandrel comprising, in combination: a main shaft to which a control torque is applied for regulating the tension in said web during the unwinding of said web from said roll, said shaft having a plurality of longitudinal grooves formed therein; a plurality of gripping flap members each disposed in one of said grooves for pivotal movement about an axis parallel to the longitudinal axis of said shaft in either direction from a radially outwardly extending direction, each of said gripping members comprising an elongated free edge gripping portion, said gripping portion moving arcuately inwardly and outwardly from the axis of said main shaft in the course of said pivotal movement; resilient means acting on said flap members and yieldingly urging pivotal movement of said flap members toward said radially extending direction to move said gripping portions outwardly for engagement with the internal surface of said core when said roll is mounted on said mandrel, the direction of said control torque being such as to produce further pivotal movement of said flap members in the same direction as that urged by said resilient means during engagement between said gripping portions and said core accompanied by further outward movement of said gripping portions for locking said core to said mandrel; core supporting means carried by said shaft, said supporting means comprising a plurality of members fitting longitudinally slidably within said core and dimensioned to support said core independently of said flap members means interconnectig all of said flap members for producing simultaneous displacement thereof in either direction from said radially extending direction, and manually operable means acting on one of said flap members for displacing said flap member in said either direction from said radially extending direction.

5. A mandrel according to claim 4, in which said free edge gripping portions of said flap members are of substantially rectangular cross-sectional configuration, said locking action being obtained by the digging of one of the square edges of said rectangular configuration into the inner surface of said tubular core.

6. A mandrel according to claim 5, in which each of said flap members is provided with shank portions which extend outwardly in said grooves beyond the ends of each flap member, said supporting means comprising collar means mounted on said main shaft and holding said shank portions in said grooves, said collar members being positioned to prevent longitudinal movement of said flap members.

7. A mandrel of the class described for rotatably supporting a roll of web material wound upon a tubular core, said mandrel comprising, in combination: a main shaft to which a control torque is applied for regulating the tension in said web during unwinding rotation of said roll; said shaft having a plurality of equally angularly spaced grooves formed in the surface thereof and extending parallel to the longitudinal axis of said shaft; a gripping flap member disposed in each groove for pivotal movement therein in either direction away from a radially outwardly extending direction, both sides of each groove being sloped to permit said pivotal movement, each gripping flap member comprising a flap portion having a free gripping edge and two pivot shank portions extending along its associated groove beyond the ends of the flap portion of said flap member; an actuating stud carried by each end of each gripping flap member and each disposed radially outwardly of one of said pivot shank portions; a pair of actuating discs rotatably disposed on said shaft adjacent the ends of said flap portions and encircling said shank portions to retain said flap members in said grooves and preventing longitudinal movement of said flap members, each of said actuating discs having a plurality of radially elongated slots formed therein, one of said actuating studs being disposed in each of said slots; bi-directionally operative resilient means acting on each of said actuating discs to rotate each disc toward a normal position and yieldingly urge simultaneous pivotal movement of said flap members toward said radially extending positions to move the free gripping edges of said flaps outwardly with respect to the longitudinal axis of said main shaft for engagement with the internal surface of said core when said roll is mounted on said mandrel, the direction of said control torque being such as to produce further pivotal movement of said flap members in the direction urged by said resilient means accompanied by further outward movement of said gripping edges for locking said roll to said mandrel; and manually operable means for displacing said flaps from said radially extending positions in said either direction prior to inserttion of said flap members in said core.

8. A mandrel according to claim 7, further comprising a pair of spring retaining collars fixedly positioned on said shaft adjacent to said actuating discs, each of said collars having a circular groove formed therein; said resilient means comprising helical spring means disposed in each of said grooves.

9. A mandrel for supporting a roll of web material wound upon a tubular core, said mandrel comprising, in combination: a revoluble main shaft adapted to have a control torque applied thereto for regulating the tension in said web material during the unwinding of said web material from said roll; a plurality of flap members carried by said shaft for rotation therewith, each of said flap members being pivoted for movement about an axis parallel to the rotational axis of said shaft; spring means yieldingly urging all of said flap members simultaneously to assume radially outwardly directed positions, each of said flap members comprising a free edge gripping portion engageable with the internal surface of said core, said edge portions defining an imaginary cylinder which, with said flap members radially outwardly directed, is of a diameter greater than the internal diameter of said core; and manually operable means connected to all of said gripping members for selectively displacing said flap members simultaneously in one direction or the other from said radially outwardly directed positions prior to insertion of said mandrel into said core.

References Cited by the Examiner

UNITED STATES PATENTS

| | | |
|---|---|---|
| 1,188,369 | 6/1916 | Chernack. |
| 2,151,831 | 3/1939 | Buccicone _____ 287—52.01 |
| 2,466,472 | 4/1949 | Oster _____ 287—52.01 |
| 2,784,820 | 3/1957 | Clark _____ 192—43.1 XR |
| 3,001,736 | 9/1961 | Schultz et al. _____ 242—72 |

STANLEY N. GILREATH, *Primary Examiner.*

MERVIN STEIN, *Examiner.*